US009902567B1

(12) United States Patent
Zimmer et al.

(10) Patent No.: US 9,902,567 B1
(45) Date of Patent: Feb. 27, 2018

(54) BRUSH DIVERTER

(71) Applicant: Intelligrated Headquarters, LLC, Mason, OH (US)

(72) Inventors: Justin J. Zimmer, Dayton, OH (US); David E. Franklin, Loveland, OH (US); Jacob D. Wieneke, Liberty Township, OH (US); William M. Saurber, III, Hamilton, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 15/684,103

(22) Filed: Aug. 23, 2017

Related U.S. Application Data

(60) Provisional application No. 62/378,974, filed on Aug. 24, 2016.

(51) Int. Cl.
  *B65G 47/34* (2006.01)
  *B65G 47/46* (2006.01)
  *B65G 47/52* (2006.01)
  *B65G 47/82* (2006.01)

(52) U.S. Cl.
  CPC .......... *B65G 47/82* (2013.01); *B65G 47/34* (2013.01); *B65G 2203/02* (2013.01); *B65G 2811/0657* (2013.01); *B65G 2811/0678* (2013.01)

(58) Field of Classification Search
  CPC ........ B65G 47/34; B65G 47/46; B65G 47/52; B65G 47/82
  USPC ............... 198/370.07, 370.08, 370.09, 370.1
  See application file for complete search history.

(56) References Cited

U.S. PATENT DOCUMENTS

| | | | | |
|---|---|---|---|---|
| 4,446,670 A | * | 5/1984 | Compagnoni | B65B 25/046 198/580 |
| 4,711,357 A | | 12/1987 | Langenbeck | |
| 4,854,441 A | * | 8/1989 | McBrady | B08B 5/02 15/308 |
| 5,217,104 A | * | 6/1993 | Pelletier | B65G 47/766 198/367 |
| 5,655,643 A | * | 8/1997 | Bonnet | B65G 47/766 198/370.08 |
| 5,887,699 A | * | 3/1999 | Tharpe | B07C 3/065 198/367 |
| 5,927,469 A | * | 7/1999 | Dunifon | B32B 17/10954 198/345.1 |

(Continued)

FOREIGN PATENT DOCUMENTS

| | | |
|---|---|---|
| GB | 1032525 A | 2/1964 |
| JP | H09155295 A | 9/1996 |

OTHER PUBLICATIONS

US Patent Application US 2002/0125101 A1, Zielinski, Sep. 12, 2002 (Year: 2002).*

(Continued)

*Primary Examiner* — Douglas A Hess
(74) *Attorney, Agent, or Firm* — Alston & Bird LLP

(57) ABSTRACT

A material handling system includes a belted conveyor that longitudinally transports low profile articles. An actuating mechanism selectively positions a counter rotating cylindrical roller brush diagonal across the conveyor surface to divert the low profile articles to a lateral destination off a side of the belted conveyor and can position the cylindrical roller brush away the belted conveyor to allow the low profile articles to transport to a longitudinal destination at a terminal end of the belted conveyor.

7 Claims, 10 Drawing Sheets

(56) References Cited

U.S. PATENT DOCUMENTS

| | | | | |
|---|---|---|---|---|
| 5,931,281 A | * | 8/1999 | Zeis | B65G 47/846 |
| | | | | 198/598 |
| 5,992,609 A | * | 11/1999 | Maier | B07C 3/065 |
| | | | | 198/358 |
| 6,533,099 B2 | * | 3/2003 | Bonham | B65G 47/44 |
| | | | | 198/360 |
| 6,607,065 B2 | * | 8/2003 | Peppel | B65G 47/766 |
| | | | | 198/367 |
| 7,963,395 B2 | * | 6/2011 | Sandberg | B29C 65/3456 |
| | | | | 206/460 |
| 8,132,661 B2 | | 3/2012 | Hendrikus et al. | |
| 8,616,361 B1 | | 12/2013 | Shankarbabu et al. | |

OTHER PUBLICATIONS

US Patent Application US 2006/0254880 A1, Van Schaijk et al., Nov. 16, 2006 (Year: 2006).*

\* cited by examiner

BRUSH DIVERTER

CROSS-REFERENCE TO RELATED APPLICATIONS

This application claims the benefit of priority under 35 U.S.C. § 119(e) to U.S. Provisional Application Ser. No. 62/378,974 entitled "Brush Diverter," filed Aug. 24, 2016, the contents of which are incorporated herein by reference in their entirety.

BACKGROUND

1. Technical Field

The present disclosure generally relates article diverters in a material handling system, and more specifically to diverters for flat articles transported on a belted conveyor.

2. Description of the Related Art

A distribution center for a set of products is a warehouse or other specialized building, often with refrigeration or air conditioning, which is stocked with products (goods) to be redistributed to retailers, to wholesalers, or directly to consumers. A distribution center is a principal part, the order processing element, of the entire order fulfillment process. A distribution center can also be called a warehouse, a DC, a fulfillment center, a cross-dock facility, a bulk break center, and a package handling center. The name by which the distribution center is known is commonly based on the purpose of the operation. For example, a "retail distribution center" normally distributes goods to retail stores, an "order fulfillment center" commonly distributes goods directly to consumers, and a cross-dock facility stores little or no product but distributes goods to other destinations.

Depending upon the types of products handled by the distribution center, certain types of automation are often employed to efficiently receive, transport, store, assemble into customer orders or store replenishment containers, and ship. Increasingly, retail distribution centers are fulfilling e-commerce orders of individual items that are difficult to transport on roller conveyors that are more appropriate for cartons. Belted conveyor can carry small and low profile packaging such as polybags that are then weighed, labeled and sorted to a shipping destination. Diverting small and low profile packaging can present a design challenge for material handling system providers. Diverts that are appropriate for cases generally are ineffective for such articles. Instead, devices such as diverter arms are used that can be moved across the conveyor to divert articles to destinations such as a chute or Gaylord container. However, even with closely positioning the diverter arm to the conveying surface, jams and damage to articles and equipment do occur as thin edges of the articles are caught.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
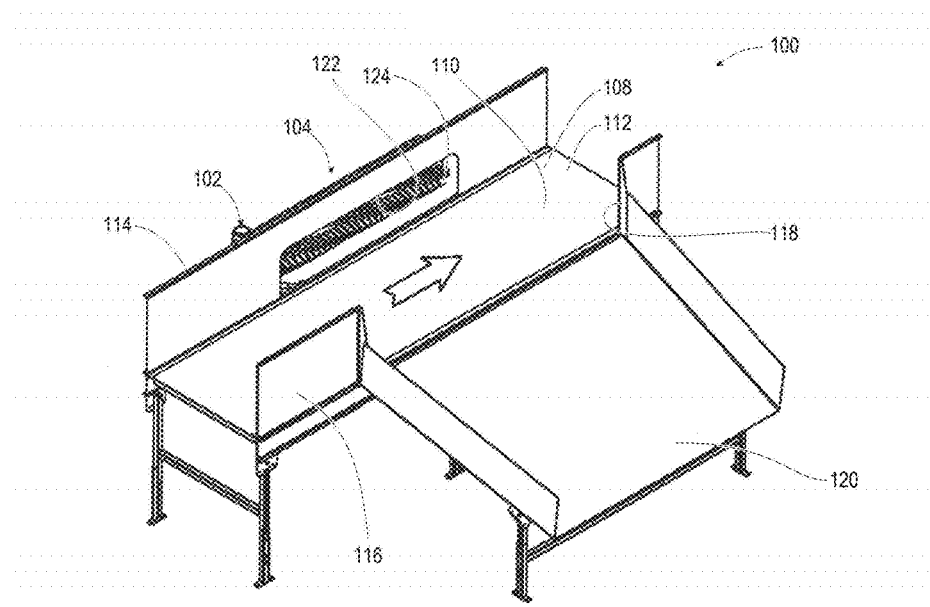
FIG. 1 illustrates an isometric view from a right rear vantage point of a material handling system and first example brush diverter in a non-diverting position relative to a belted conveyor, according to one or more embodiments.

In an aspect of the present innovation, a material handling system includes a belted conveyor supported by a frame and that longitudinally transports low profile articles to a longitudinal destination at a terminal end of the belted conveyor. The material handling system includes a cylindrical roller brush having a central shaft and includes an actuating mechanism that positions the central shaft. The actuating mechanism in turn includes mounting member attached for axial rotation by the central shaft. The actuating mechanism includes an actuator attached proximate to the frame of the belted conveyor and movably attached to the mounting member to position the cylindrical roller brush: (i) in a first position having a rotating axis of the central shaft in parallel alignment and laterally diagonal with a conveying surface with bristles of the cylindrical roller brush contacting any low profile article conveyed to the cylindrical roller brush; and (ii) in a second position having the rotating axis of the central shaft spaced farther away from the conveying surface than in the first position to allow low profile articles to longitudinally convey to the longitudinal destination. The material handling system includes a rotation motor operatively engaged to the central shaft to opposingly rotate the cylindrical roller brush. The cylindrical roller brush maintains contacted low profile articles on the conveying surface upstream of the brush until the low profile articles divert off of a lateral side of the belted conveyor to a lateral destination. The material handling system includes a controller in communication with the actuating mechanism and the rotation motor to selectively position the cylindrical roller brush in one of the first position with rotation motor activated and the second position.

In a first embodiment, the actuated arm is movably attached to the base to rotate in a horizontal plane between the first and second positions. In a second embodiment, the actuated arm is movably attached to the base to vertically translate between the first and second positions that have parallel rotation axes. In a third embodiment, the actuated arm is movably attached to the base to rotate in a vertical plane between the first and second positions.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 2:
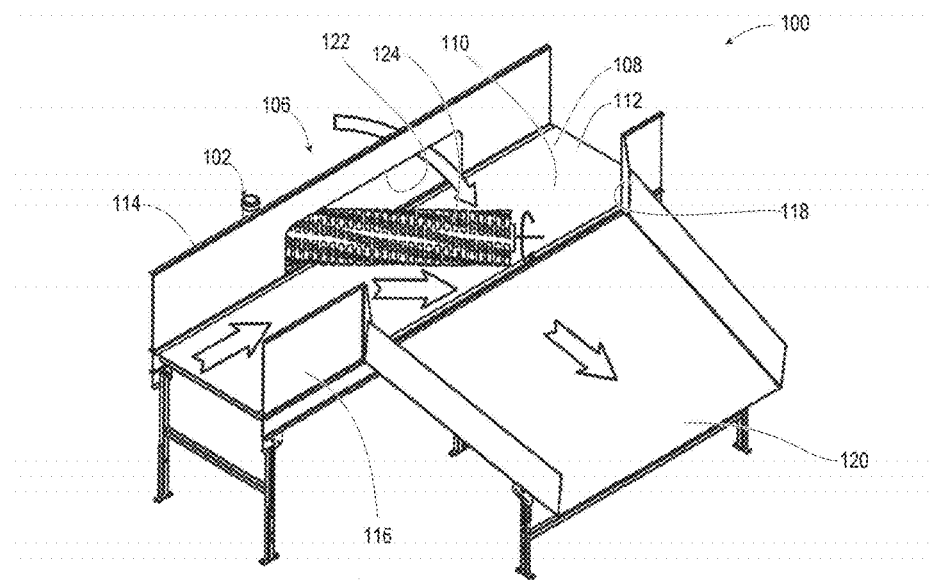
FIG. 2 illustrates an isometric view from a right rear vantage point of the material handling system of FIG. 1 with the first example brush diverter horizontally rotated to a non-diverting position relative to the belted conveyor, according to one or more embodiments.
Figure 3:
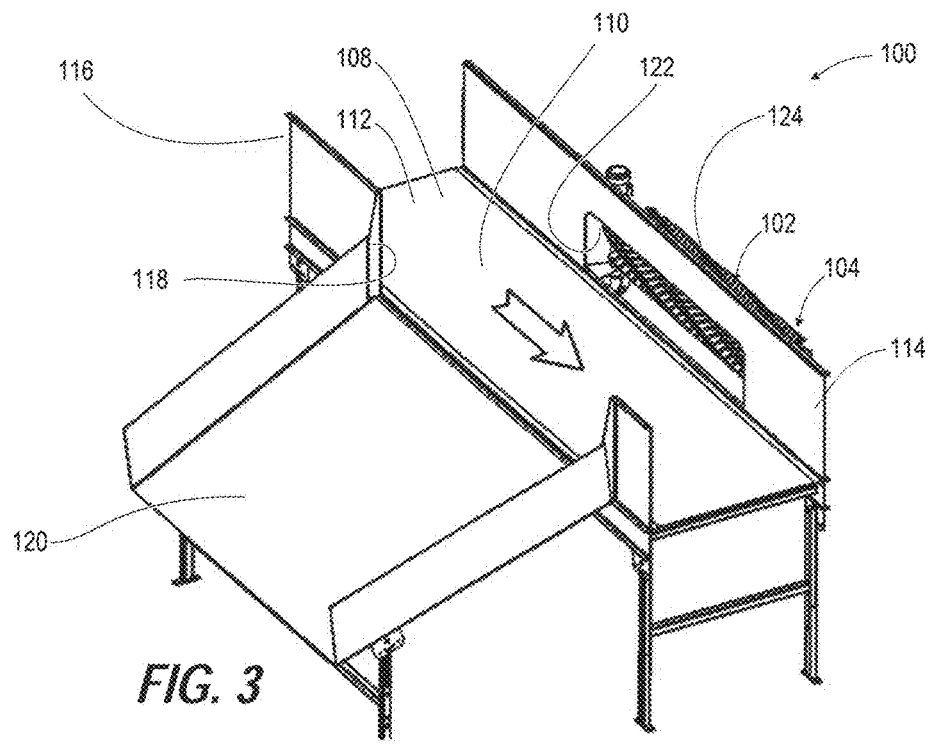
FIG. 3 illustrates an isometric view from a right front vantage point of the material handling system of FIG. 1, according to one or more embodiments.
Figure 4:
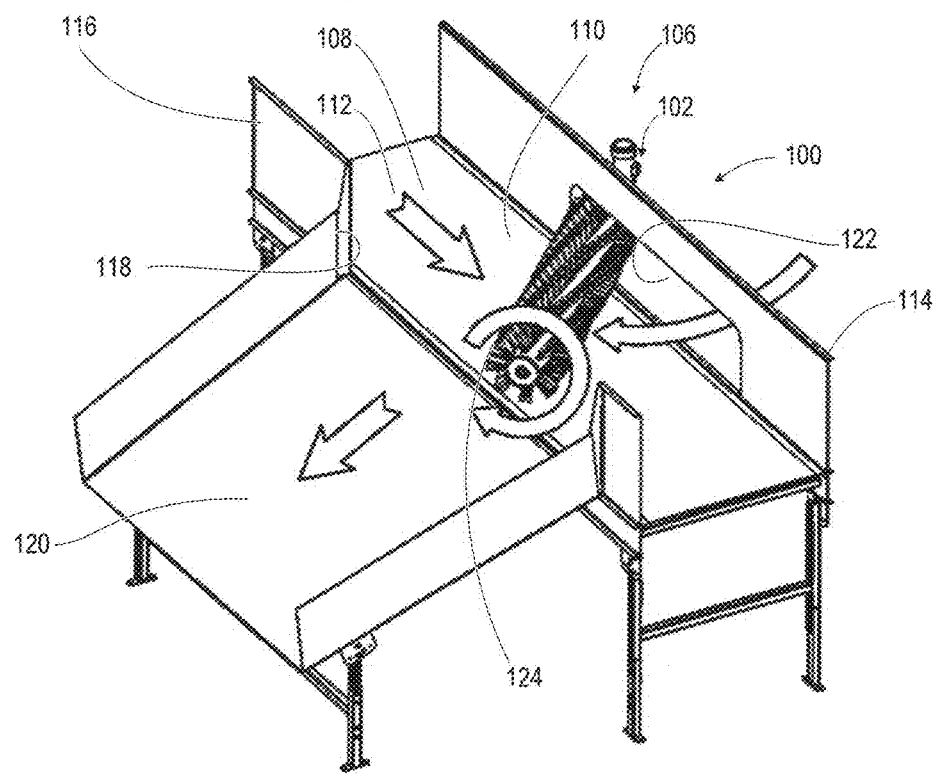
FIG. 4 illustrates an isometric view from a right front vantage point of the material handling system of FIG. 2, according to one or more embodiments.
Figure 5:
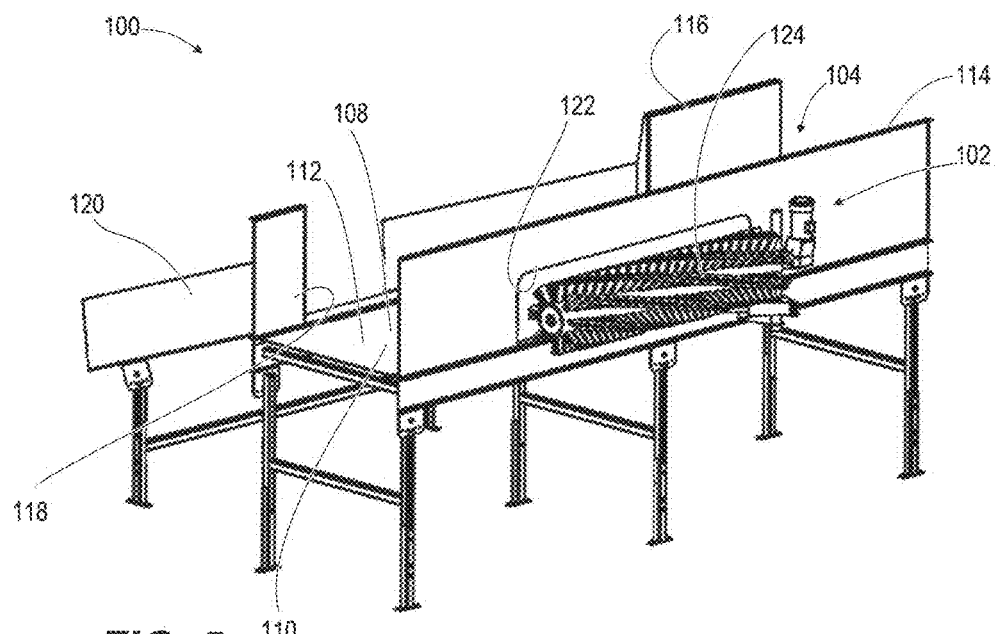
FIG. 5 illustrates an isometric view from a left front vantage point of the material handling system of FIG. 1, according to one or more embodiments.
Figure 6:
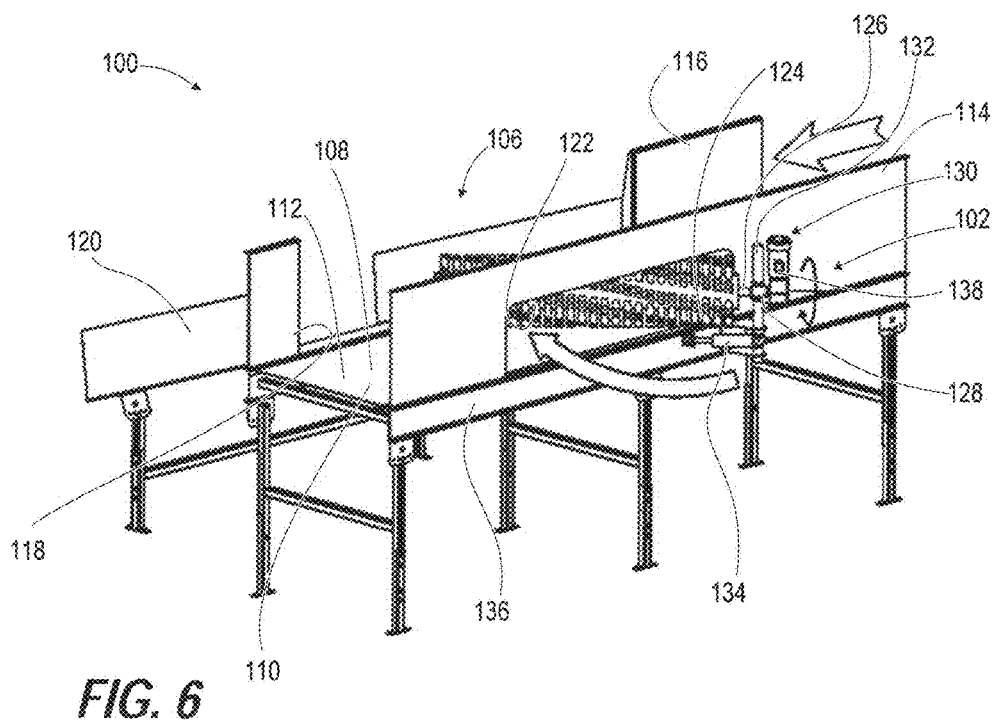
FIG. 6 illustrates an isometric view from a left front vantage point of the material handling system of FIG. 2, according to one or more embodiments.

In FIGS. 1-6, a material handling system 100 includes a first example brush diverter 102 that is horizontally rotated from a non-diverting first position 104 (FIGS. 1, 3, 5) to a diverting second position 106 (FIGS. 2, 4, 6). A belted conveyor 108 has an endless apron 110 having a top conveying surface 112. Left and right vertical sides 114, 116 prevent articles from falling off of the conveying surface 112 with an exception of a lateral opening 118 that communicates with a lateral destination depicted as a chute 120. Another exception is a brush aperture 122 in the left vertical side 114 through which a cylindrical roller brush 124 of the brush diverter 102 is rotated over the conveying surface 112 horizontally at a lateral diagonal orientation for diverting in the second position 106 (FIGS. 2, 4, 6) and retracted to the non-diverting first position 104 (FIGS. 1, 3, 5).

With particular reference to FIG. 6, the brush diverter 102 includes a central shaft 126 that is received for axial rotation about a horizontal axis by a mounting member 128 of a diverter actuating mechanism 130. The mounting member 128 in turn is received by a vertical spindle 132 for horizontal rotation. An actuator 134 is attached to a frame 136 that supports the belted conveyor 108. The actuator 134 operatively engages the vertical spindle 132 to rotate the vertical spindle 132, and thus the cylindrical roller brush 124, between the first and second positions 104, 106. A rotation motor 138 is attached to move with the mounting member 128 and is engaged to rotate the central shaft 126 and cylindrical roller brush 124 in a counter rotational movement.

Figure 7:
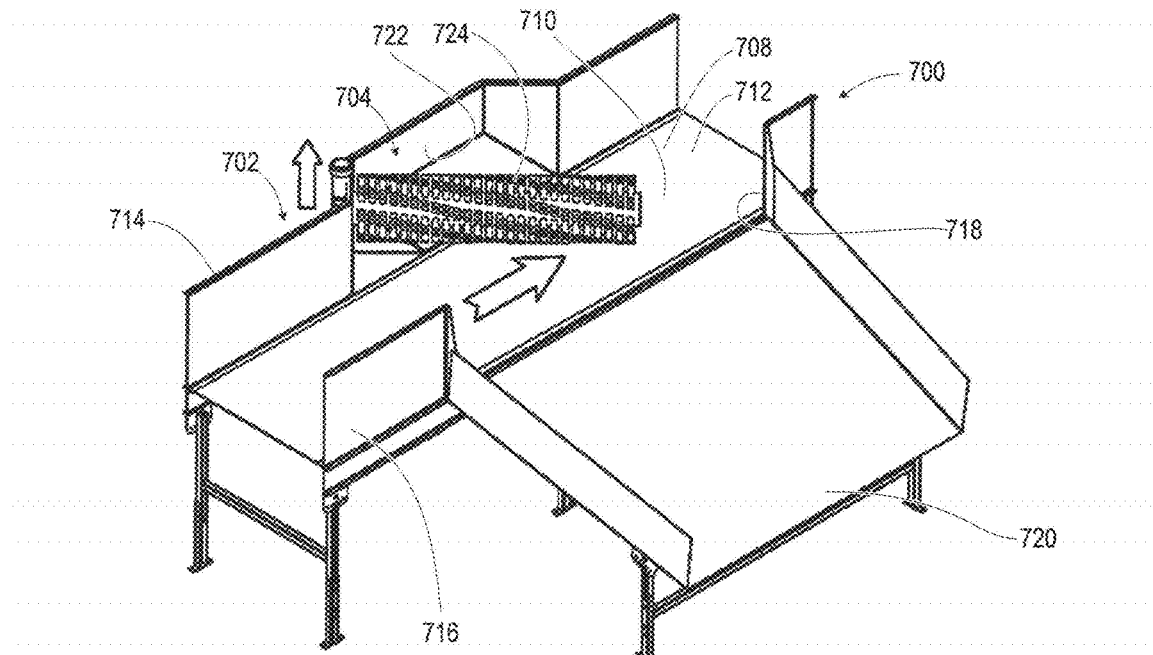
FIG. 7 illustrates an isometric view from a right rear vantage point of a material handling system and second example brush diverter in a non-diverting position relative to a belted conveyor, according to one or more embodiments.
Figure 8:
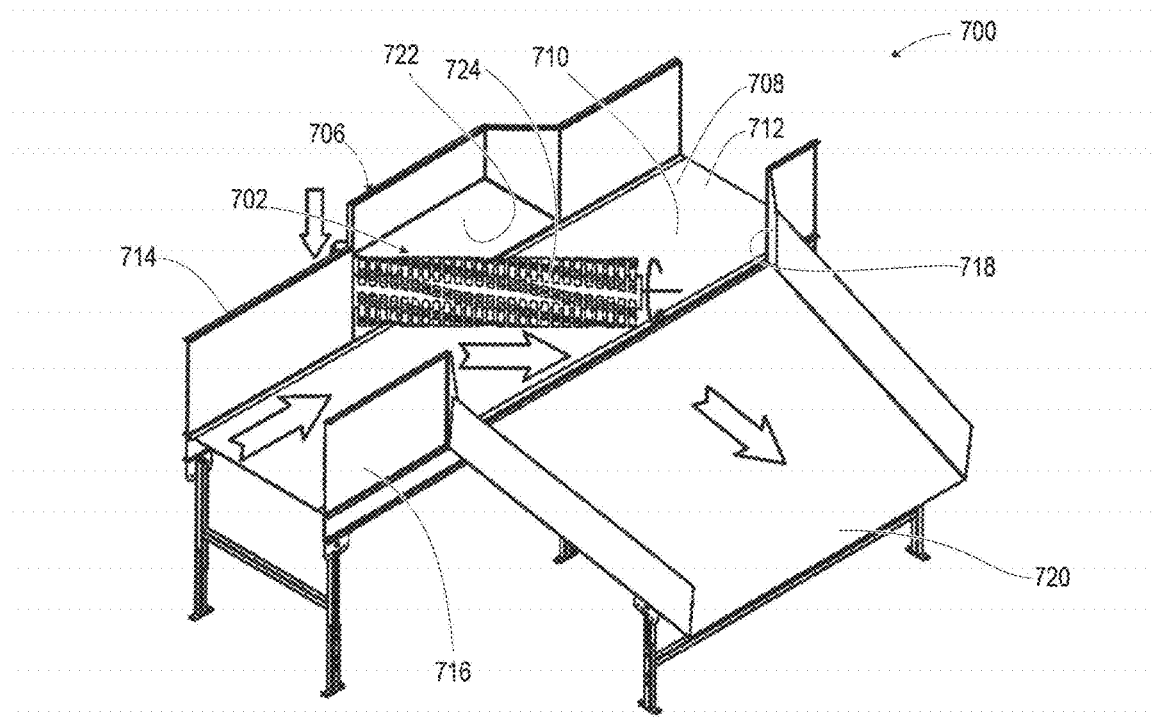
FIG. 8 illustrates an isometric view from a right rear vantage point of the material handling system of FIG. 7 with the second example brush diverter vertically translated to a non-diverting position relative to the belted conveyor, according to one or more embodiments.
Figure 9:
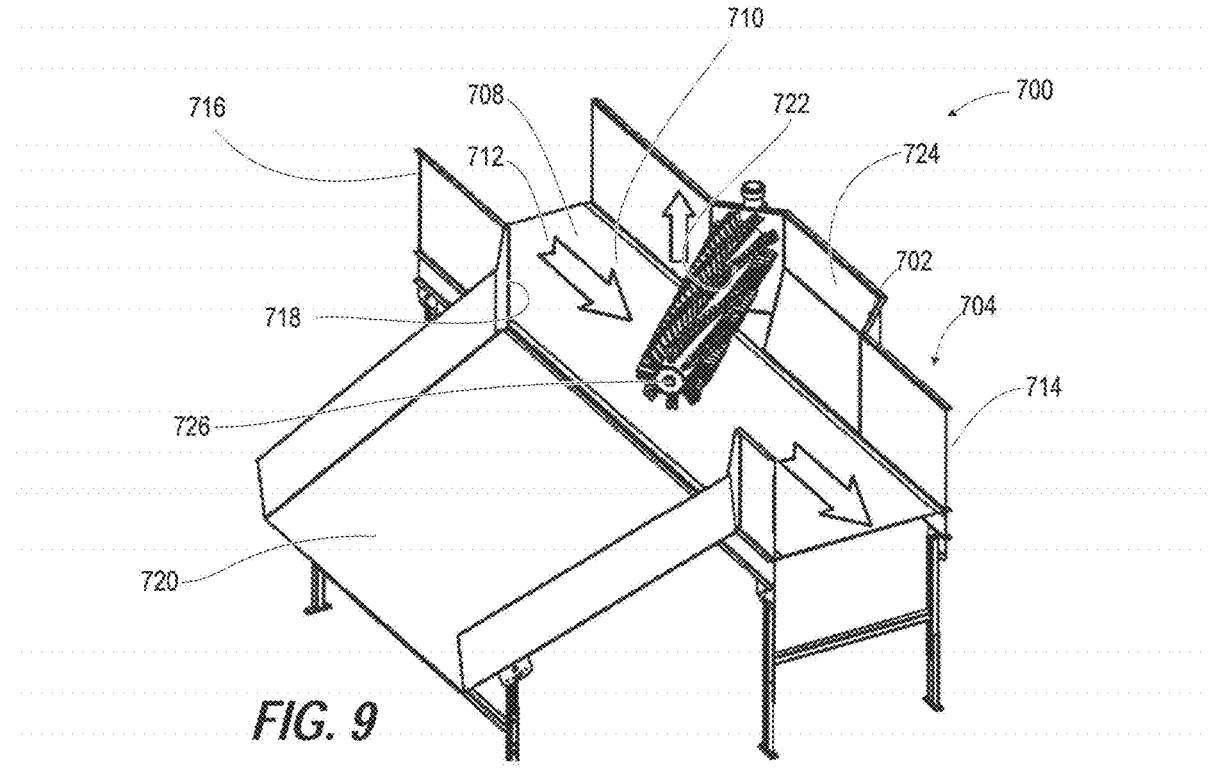
FIG. 9 illustrates an isometric view from a right front vantage point of the material handling system of FIG. 7, according to one or more embodiments.
Figure 10:
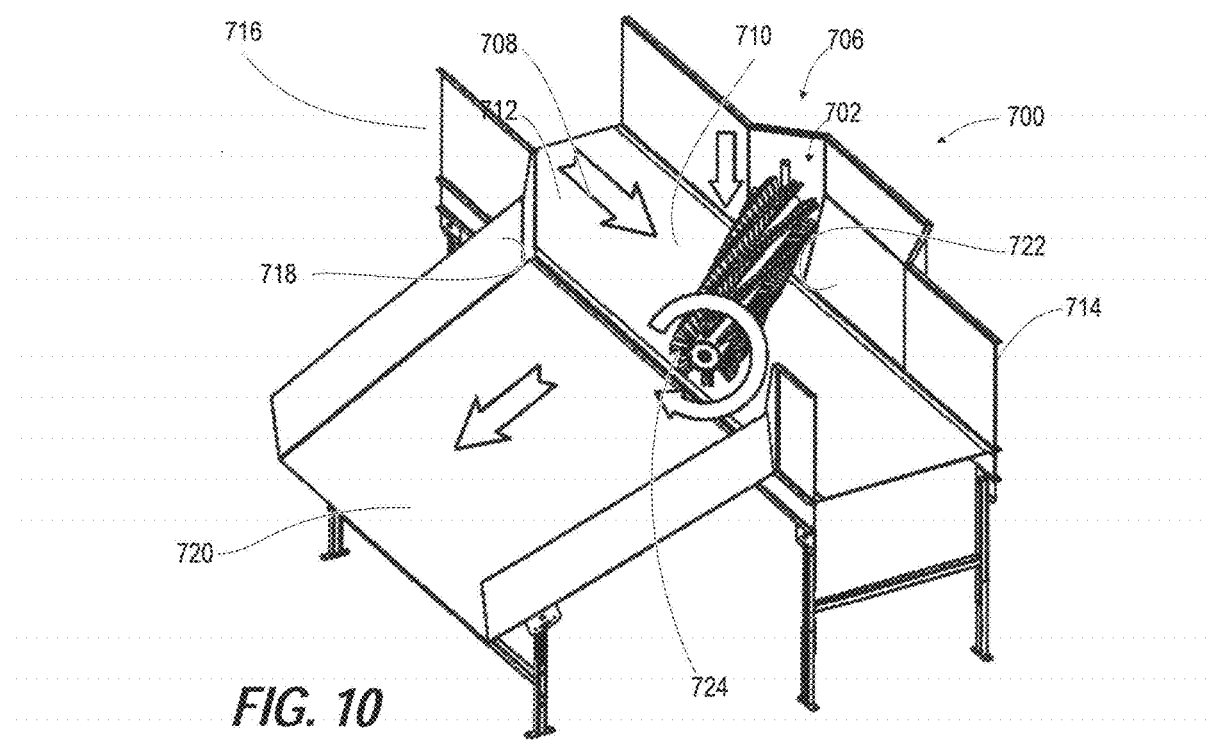
FIG. 10 illustrates an isometric view from a right front vantage point of the material handling system of FIG. 8, according to one or more embodiments.
Figure 11:
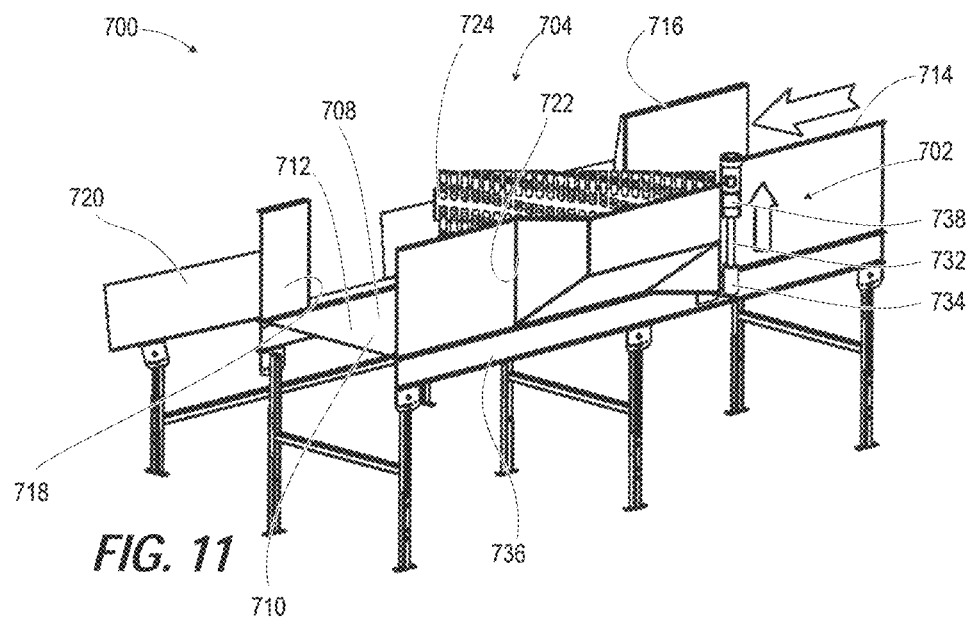
FIG. 11 illustrates an isometric view from a left front vantage point of the material handling system of FIG. 7, according to one or more embodiments.
Figure 12:
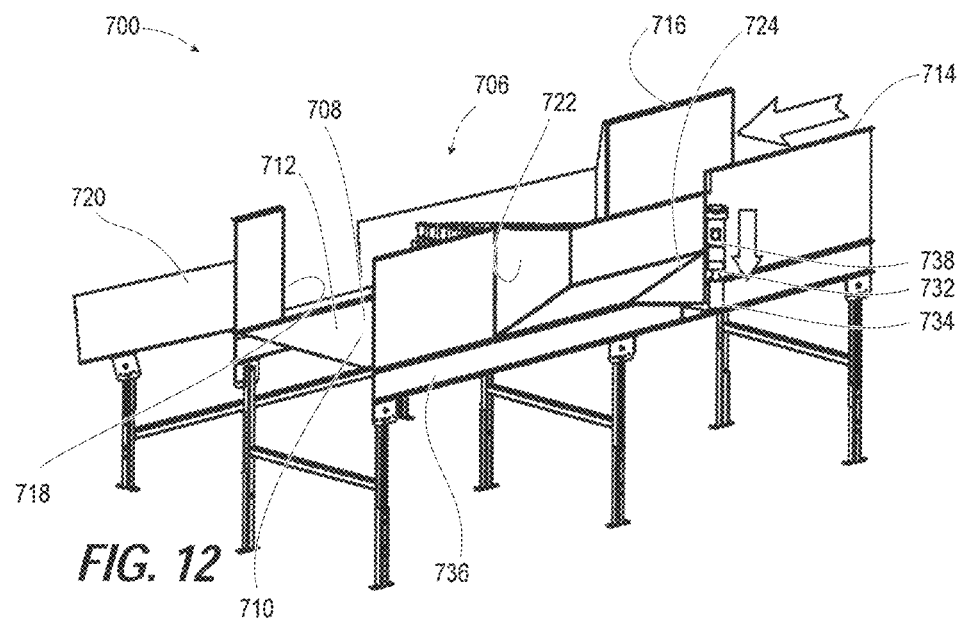
FIG. 12 illustrates an isometric view from a left front vantage point of the material handling system of FIG. 8, according to one or more embodiments.

In FIGS. 7-12, a material handling system 700 includes a second example brush diverter 702 that is vertically translated from a non-diverting first position 704 (FIGS. 7, 9, 11) to a diverting second position 706 (FIGS. 8, 10, 12). A belted conveyor 708 has an endless apron 710 having a top conveying surface 712. Left and right vertical sides 714, 716 prevent articles from falling off of the conveying surface 712 with an exception of a lateral opening 718 that communicates with a lateral destination depicted as a chute 720. The left vertical side 714 has a bumped out area 722 for proximal end of a cylindrical roller brush 724 of the brush diverter 702, accommodating vertical translation relative to the conveying surface 712 for diverting in the second position 706 (FIGS. 8, 10, 12) and raised to the non-diverting first position 704 (FIGS. 7, 9, 11).

Figure 13:
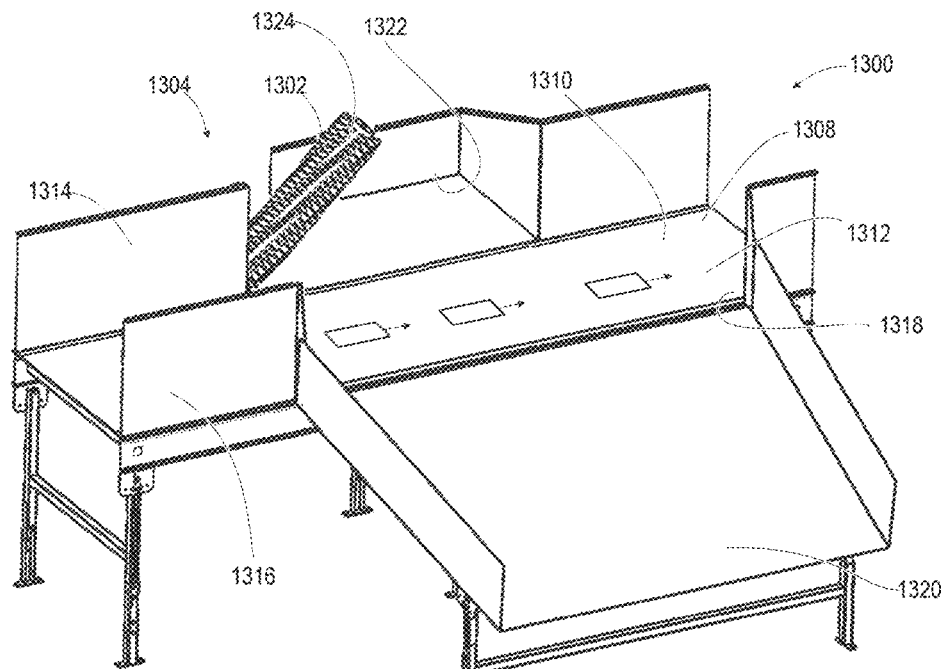
FIG. 13 illustrates an isometric view from a right rear vantage point of a material handling system having a third example brush diverter in a non-diverting position relative to a belted conveyor, according to one or more embodiments.

FIG. 9 illustrates a central shaft 726 about which cylindrical roller brush 724 axially and horizontally rotates driven by a rotation motor 738. FIGS. 12-13 illustrate that cylindrical roller brush 724, central shaft 726, and rotation motor 738 are received at a top end of a vertical spindle 732 that is received for vertical translation by an actuator 734. Actuator 734 is attached to a frame 736 that supports the belted conveyor 708.

Figure 14:
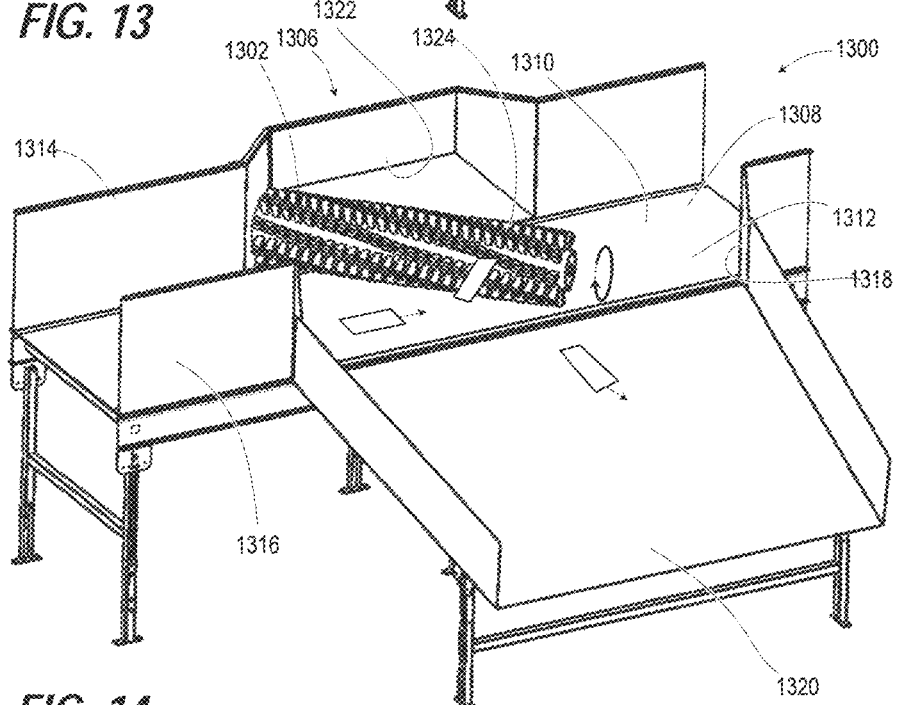
FIG. 14 illustrates an isometric view from a right rear vantage point of the material handling system of FIG. 13 with the third example brush diverter vertically rotated to a non-diverting position relative to the belted conveyor, according to one or more embodiments.

FIGS. 13-14 illustrate a material handling system 1300 that includes a third example brush diverter 1302 that is vertically rotated from a non-diverting first position 1304 (FIG. 13) to a diverting second position 1306 (FIG. 14). A belted conveyor 1308 has an endless apron 1310 having a top conveying surface 1312. Left and right vertical sides 1314, 1316 prevent articles from falling off of the conveying surface 1312 with an exception of a lateral opening 1318 that communicates with a lateral destination depicted as a chute 1320. The left vertical side 1314 has a bumped out area 1322 for proximal end of a cylindrical roller brush 1324 of the brush diverter 1302, accommodating vertical rotation relative to the conveying surface 1312 for diverting in the second position 1306 (FIG. 14) and raised to the non-diverting first position 1304 (FIG. 13).

Figure 15:
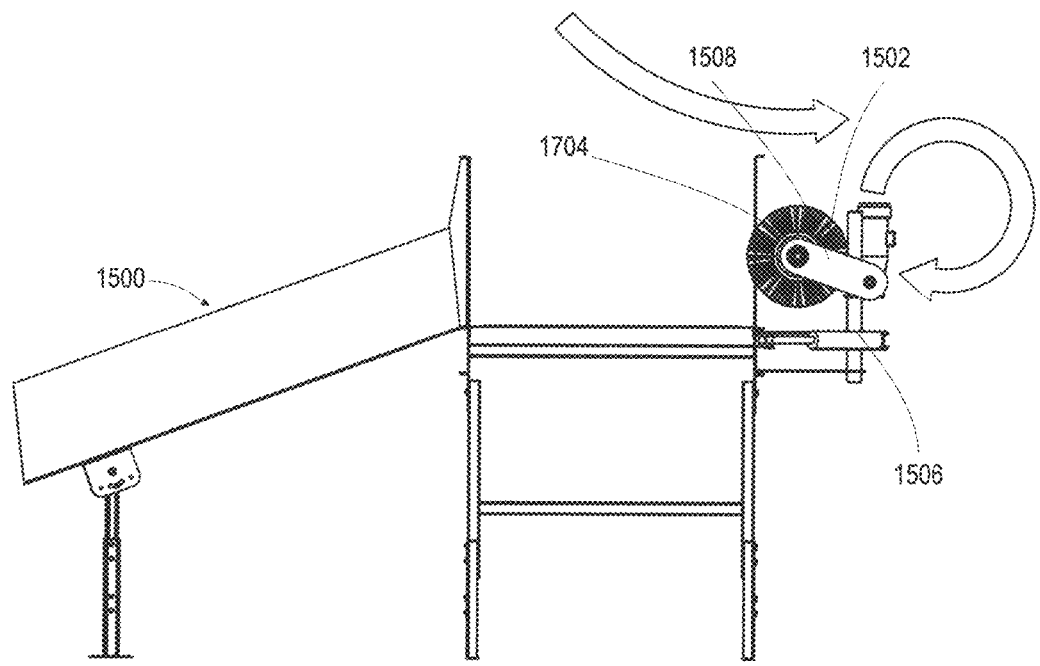
FIG. 15 illustrates a front side view of a material handling system having a brush diverter in a retracted position, according to one or more embodiments.
Figure 16:
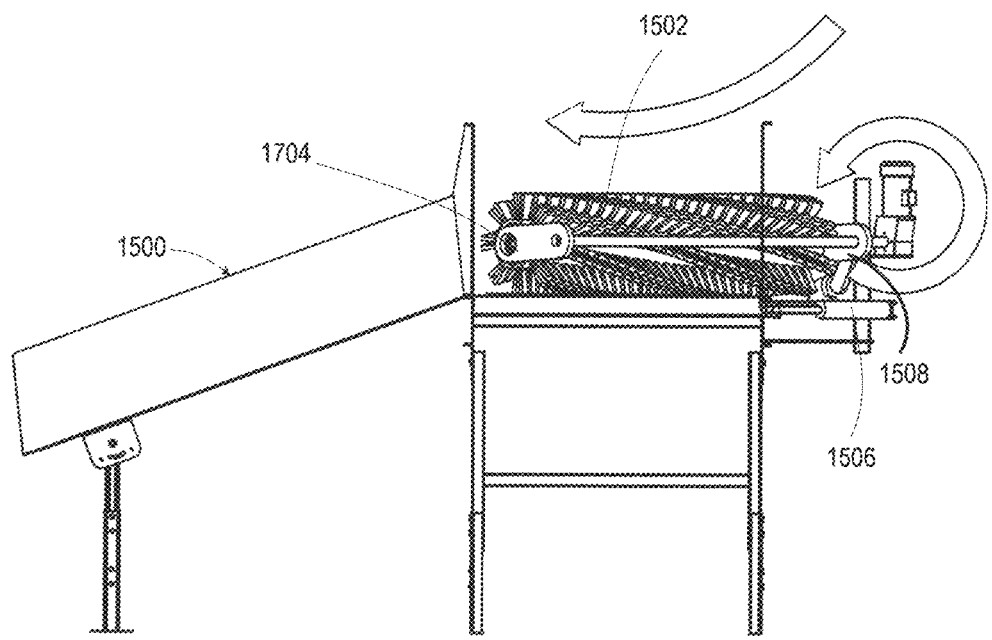
FIG. 16 illustrates front side view of the material handling system of FIG. 15 having the brush diverter in an extended position, according to one or more embodiments.

FIGS. 15-16 illustrate a material handling system 1300 that includes a fourth example brush diverter 1502 having an actuated arm 1504 is movably attached to a base 1506 to allow simultaneous movement rotating in the horizontal plane and translation in the vertical plane via a mechanical linkage 1508.

Figure 17:
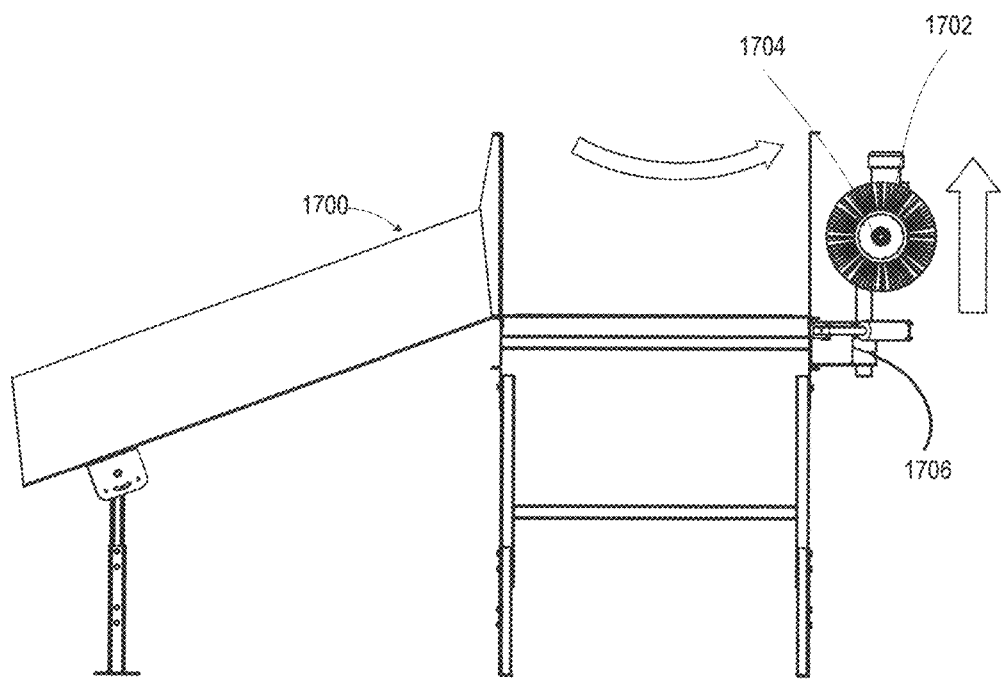
FIG. 17 illustrates a front side view of a material handling system having a brush diverter in a retracted position, according to one or more embodiments.
Figure 18:
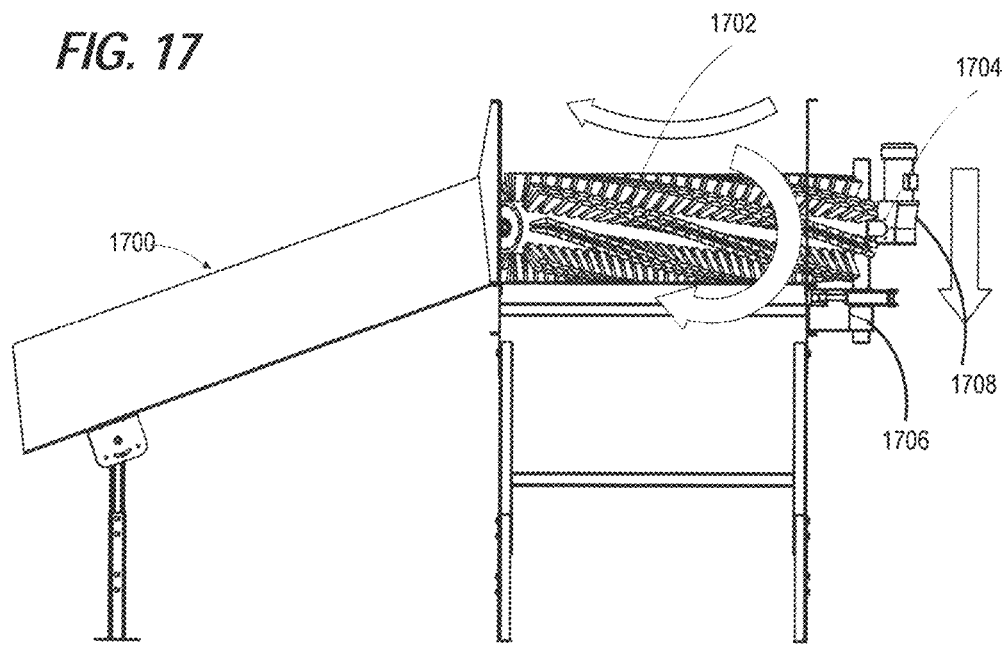
FIG. 18 illustrates front side view of the material handling system of FIG. 17 having the brush diverter in an extended position, according to one or more embodiments.

FIGS. 17-18 illustrates front side view of a material handling system 1700 having a fifth example brush diverter 1702 in a retracted position (FIG. 17) and in an extended position (FIG. 18). An actuated arm 1704 is movably attached to a base 1706 to allow simultaneous movement rotating in the horizontal plane and translation in the vertical plane via helical cam mechanism 1708 (FIG. 18).

For clarity, embodiments illustrated herein are each diverted to a right side of a belted conveyor; however, a laterally mirrored implementation can divert to the left side. In one or more embodiments, a brush diverter can be a subsystem mounted in proximity to a conveying surface such as in a retrofit installation. Rather than horizontal and straight, in one or more embodiments the conveying surface can inclined, declined, or curved.

Figure 19:
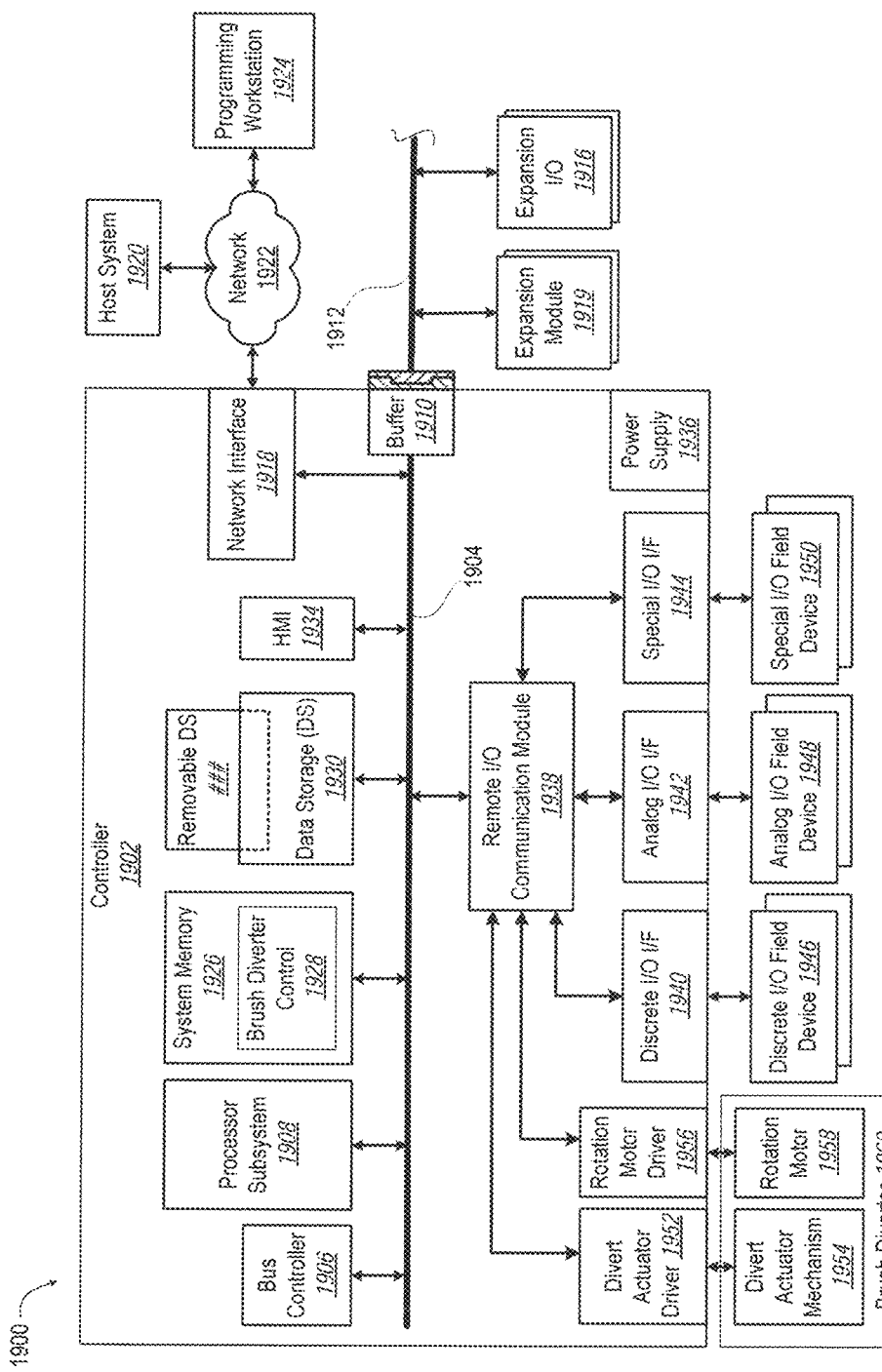
FIG. 19 illustrates a block diagram of an example controller within which certain of the functional aspects of the described embodiments may be implemented.

FIG. 19 illustrates a material handling control system 1900 that provides an exemplary environment within which one or more of the described features of the various embodiments of the disclosure can be implemented. A controller 1902 can be implemented as a unitary device or distributed processing system. The controller 1902 includes functional components that communicate across a system interconnect of one or more conductors or fiber optic fabric that for clarity is depicted as a system bus 1904. System bus 1904 may include a data bus, address bus, and control bus for communicating data, addresses and control information between any of these coupled units. A bus controller 1906 can provide infrastructure management of the system bus 1904. Functional components can include a processor subsystem 1908 consisting of one or more central processing units (CPUs) 1910, digital signal processor/s (DSPs) 1912 and processor memory 1914. Processor subsystem 1908 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system. The controller 1902 may be scalable, such as having a buffer 1910 on the system bus 1904 that communicatively couples with an expansion bus 1912 for communicating and interfacing to expansion modules 1919 and expansion input/output (I/O) 1916.

In accordance with various aspects of the disclosure, an element, or any portion of an element, or any combination of elements may be implemented with processor subsystem 1908 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result.

Controller 1902 may include a network interface device (NID) 1918 that enables controller 1902 to communicate or interface with other devices, services, and components that are located external to controller 1902, such as a host system 1920. Host system 1920 can provide scheduling information to the controller 1902 such as identification of items being directed to a controlled component and their assigned destination. Host system 1920 can provide programming for the controller 1902 and obtain diagnostic and status monitoring data. These networked devices, services, and components can interface with controller 1902 via an external network, such as example network 1922, using one or more communication protocols. Network 1922 can be a local area network, wide area network, personal area network, and the like, and the connection to and/or between network and controller 1902 can be wired or wireless or a combination thereof. For purposes of discussion, network 1922 is indicated as a single collective component for simplicity. However, it is appreciated that network 1922 can comprise one or more direct connections to other devices as well as a more complex set of interconnections as can exist within a wide area network, such as the Internet or on a private intranet. For example, a programming workstation 1924 can remotely modify programming or parameter settings of controller 1902 over the network 1922. Various links in the network 1922 can wired or wireless.

System memory 1926 can be used by processor subsystem 1908 for holding functional components such as data and software such as a brush diverter control application 1928 that is retrieved from data storage 1930. Data and software can be provided to the controller 1902 or exported from the controller 1902 via removable data storage (RDS) 1932. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 1926 is random access memory, which may or may not be volatile, and data storage 1930 is generally nonvolatile. System memory 1926 and data storage 1930 contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Certain manual interactions and indications can also be provided via a human-machine interface (HMI) 1934 that is integral or connected to the controller 1902. HMI can be formed of one or more devices that provides input and output functions such as via a touch screen graphical display, keypad, microphone, speaker, haptic device, camera, gauges, light indicators, dials, switches, etc. A power supply 1936 provides regulated voltages at required levels for the various components of the controller 1902 and can draw upon facility power.

A remote I/O communication module 1938 can provide communication protocol for handling of various inputs and outputs between the system bus 1904 and controller interfaces such as a discrete I/O interface/s 1940, analog I/O interface/s 1942, and special I/O interface/s 1944. Each interface 1940, 1942, 1944 can provide as necessary analog-to-digital or digital-to-analog conversion, signal processing, buffering, encoding, decoding, etc., in order to communicate with discrete, analog, or special I/O field devices 1946, 1948, 1950, respectively. In one or more embodiments, controller 1902 includes a divert actuator driver 1952 that controls a divert actuator mechanism 1954 and a rotation motor driver 1956 that controls a rotation motor 1958. A brush diverter 1960 includes the divert actuator mechanism 1954 and the rotation motor 1958. The brush diverter control application 1928 executed by the processor subsystem 1908 is responsive to the HMI 1934, programming workstation 1924, or the host system 1920 to configure the brush diverter 1960 for diverting or non-diverting operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A material handling system, comprising:
   a belted conveyor supported by a frame and that longitudinally transports low profile articles to a longitudinal destination at a terminal end of the belted conveyor;
   a cylindrical roller brush having a central shaft;
   an actuating mechanism comprising:
      a amounting member attached for axial rotation by the central shaft; and
      an actuator attached proximate to the frame of the belted conveyor and movably attached to the mounting member to position the cylindrical roller brush:
         (i) in a first position having a rotating axis of the central shaft in parallel alignment and laterally diagonal with a conveying surface with bristles of the cylindrical roller brush contacting any low profile article conveyed to the cylindrical roller brush; and
         (ii) in a second position having the rotating axis of the central shaft spaced farther away from the conveying surface than in the first position to allow low profile articles to longitudinally convey to the longitudinal destination;
   a rotation motor operatively engaged to the central shaft to opposingly rotate the cylindrical roller brush to maintain contacted low profile articles on the conveying surface until the low profile articles divert off of a lateral side of the belted conveyor to a lateral destination; and
   a controller in communication with the actuating mechanism and the rotation motor to selectively position the cylindrical roller brush in one of the first position with rotation motor activated and the second position.

2. The material handling system of claim 1, wherein the actuator is movably attached to a base to rotate in a horizontal plane between the first and second positions.

3. The material handling system of claim 1, wherein the actuator is movably attached to a base to vertically translate between the first and second positions that have parallel rotation axes.

4. The material handling system of claim 1, wherein the actuator is movably attached to a base to rotate in a vertical plane between the first and second positions.

5. The material handling system of claim 1, wherein the actuator is attached to the frame of the belted conveyor.

6. The material handling system of claim 1, wherein the actuator is movably attached to a base to allow simultaneous movement rotating in the horizontal plane and translation in the vertical plane via helical cam mechanism.

7. The material handling system of claim 1, wherein the actuator is movably attached to a base to allow simultaneous movement rotating in the horizontal plane and translation in the vertical plane via a mechanical linkage.

\* \* \* \* \*